United States Patent [19]
Stoneham

[11] Patent Number: 5,140,353
[45] Date of Patent: Aug. 18, 1992

[54] CAMERA APPARATUS FOR PSEUDO-FORMAT FILM ENCODEMENT

[75] Inventor: Jeffrey R. Stoneham, Spencerport, N.Y.

[73] Assignee: Eastman Kodak Company, Rochester, N.Y.

[21] Appl. No.: 708,960

[22] Filed: May 31, 1991

[51] Int. Cl.$^5$ ............................................. G03B 17/24
[52] U.S. Cl. .................................................... 354/105
[58] Field of Search ................................ 354/105, 106

[56] References Cited

U.S. PATENT DOCUMENTS

| | | | |
|---|---|---|---|
| Re. 32,797 | 12/1988 | Harvey | 354/481 |
| 3,490,844 | 1/1970 | Sapp | 355/40 |
| 4,357,102 | 11/1982 | Tarren et al. | 355/77 |
| 4,975,732 | 12/1991 | Robison et al. | 355/40 |

*Primary Examiner*—Michael L. Gellner
*Attorney, Agent, or Firm*—Francis H. Boos, Jr.

[57] ABSTRACT

Apparatus in a simple low cost camera for encoding predetermined pseudo-formats of exposed image frames on film of the type having a magnetic layer thereon in which there is a data track prerecorded on the film. A user-operable selector means on the camera is set to establish the format of an image frame to be exposed on the film. In response to the selector means, a magnetic erasure means is activated by an erasure encodement signal generating means to selectively erase predetermined portions of a segment of the data track associated with a corresponding pseudo-format exposed image frame. Means are provided for inhibiting activation of the erasure means when the film is advanced in the camera in a direction opposite to the direction associated with frame-by-frame advance during the picture-taking process.

5 Claims, 6 Drawing Sheets

CAMERA APPARATUS FOR PSEUDO-FORMAT FILM ENCODEMENT

CROSS REFERENCE TO RELATED APPLICATIONS

This application discloses subject matter related to the disclosures of U.S. patent application Ser. No. 708,418, entitled "Camera Apparatus With Pseudo-Format Film Encodement" filed concurrently herewith in the name of James Wesley Cannon and U.S. patent application Ser. No. 708,964 entitled "Camera Apparatus With Pseudo-Format Film Encodement" filed concurrently herewith in the name of Paul Lee Taillie.

FIELD OF INVENTION

This invention relates to the field of camera apparatus and more specifically to apparatus adapted to encode film to indicate the existence of pseudo-format image exposure frames on film, the pseudo format option typically being pseudo-telephoto or pseudo-panoramic images.

BACKGROUND OF INVENTION

A pseudo-telephoto ("pseudo-tele") print is one that is made from a central portion of a film image frame that has the same width-to-length ratio, e.g. 1:1.5, as that of the full sized frame. During the printing process, the peripheral margins of the image frame are masked and the central portion is enlarged to the desired size to give a print with an apparent telephoto or close-up format. The degree of telephoto effect is determined by the enlargement and masking employed at the printer.

A pseudo-panoramic ("pseudo-pan") print is one in which the upper and lower margins of the image frame are masked, i.e. eliminated from the print, to provide a viewing area with a width-to-length ratio greater than 1:2 and preferably 1:3. During the printing process, the film image frame is masked as described and the image is enlarged to provide a full height print with the appearance of a panoramic or elongated format. Both pseudo-tele and pseudo-pan prints are thus accomplished by adjustment of the printer without the need for the use of a true panoramic or telephoto lens in the camera.

The foregoing pseudo-formats and exemplary camera apparatus for implementing them are described more fully in commonly assigned U.S. Pat. No. 3,490,844—Sapp, and in U.S. Pat. No. 4,357,102—Taren et. al., respectively, the disclosures of which are incorporated herein by reference. Commonly assigned U.S. Pat. Re. 32,797 describes apparatus for optically encoding the film with indicia at the appropriate frames to indicate the existence of a particular pseudo-format to enable automatic processing of the film in the printing process.

In commonly assigned U.S. Pat. No. 4,975,732—Robison et al, there is described photographic film technology embodying a layer of virtually transparent magnetic material coated on film on which information concerning film characteristics is magnetically recorded by the film manufacturer in a plurality of parallel tracks longitudinally disposed on the film. The information may be used by the camera to set picture-taking characteristics tailored to the specific film type in the camera. For this purpose, a magnetic read head would be embodied in the camera. Similarly, a magnetic read head would be included in the photofinishing printer to make use of such information during photofinishing processes to set certain operating characteristics of the printer.

As described in the '732 patent, such information is recorded as discrete, encoded data bits in a plurality of parallel data tracks. The tracks may contain real data concerning the film or, alternatively, dummy data bits may be recorded serially in certain of the tracks to establish the existence of the tracks. In a camera designed to make optimum use of the recorded film data a magnetic read head would be provided. Additionally, it would be expected that such a camera would be provided with the means, either via the same magnetic read head or a separate write head, to record data onto the film which could indicate the extent of film exposed in the camera as well as characteristics of the scene and of the camera settings involved in each exposure which are also useful in the photofinishing process. The disclosure of the '732 patent also contemplates that data recorded on the film by the camera magnetic head may include data indicating when pseudo-telephoto or pseudo-panoramic images are exposed in the camera at particular image frames. However, magnetic recording apparatus of the type capable of recording information in the form of discrete data bits is a relatively expensive feature that would tend to be limited to more costly cameras and consequently would not be suitable for use in low cost cameras. It is therefore desirable that some relatively inexpensive means be provided in low cost cameras that would take advantage of the recording capability of the magnetically coated film to provide an indication of when pseudo-format image frames exist on the film and preferably to differentiate between pseudo-telephoto and pseudo-panoramic image frames.

It is accordingly an object of the present invention to provide apparatus for indicating on film with a magnetic recording layer the existence of pseudo-format image frames on the film.

It is a further object of the invention to provide apparatus of the type described that is simple and inexpensive and thus suitable for use in low cost cameras.

It is a still further object of the invention to provide camera apparatus for recording a pseudo-format indication on film having a magnetic recording layer but that does not require the use of a relatively costly magnetic write head of the type used to write encoded data bits on the film.

SUMMARY OF INVENTION

In accordance with the invention, therefore, photographic camera apparatus is provided for encoding the existence of pseudo-format image frame exposures on film of the type having a layer of magnetic recording material thereon. The apparatus of the invention comprises switch means for selecting a predetermined pseudo-format encodement scheme to be encoded on the magnetic layer and magnetic record head means positioned over the film magnetic layer for generating a magnetic field extending into the magnetic layer. The apparatus of the invention further comprises encodement signal generating means coupled to the magnetic record head means and responsive to the switch means for activating the record head means to record the selected pseudo-format encodement scheme on the magnetic layer in a path segment associated with the corresponding pseudo-format image frame.

In one preferred form of the invention described in detail below, the apparatus is adapted to operate with film of the type having a pre-recorded data track in the magnetic layer extending lengthwise along the film. In this embodiment, the magnetic record head means comprises an erasure means which is activated by the encodement signal generating means to selectively erase portions of a segment of the data track associated with the pseudo-format image frame, the selectively erased portions corresponding to the preselected encodement scheme.

To ensure that inadvertent erasure encodement of the data track occurs when the film is advanced in the camera in the direction corresponding to frame-by-frame advance during picture taking, means are provided for sensing the direction of film advance and for inhibiting activation of the erasure means when the film in the direction opposite to the frame-by-frame advance direction.

DETAILED DESCRIPTION

Figure 1:
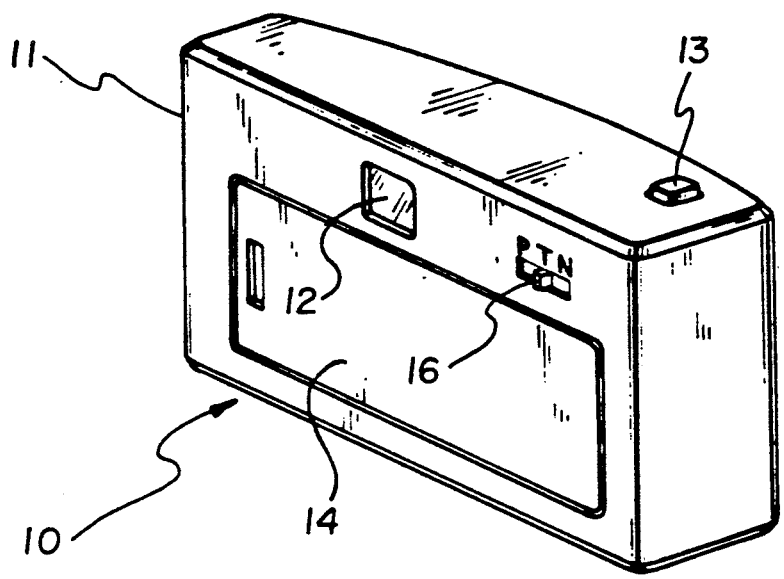
FIG. 1 is a perspective rear view of a camera illustrating an image, frame format selection button used in the apparatus of the invention.
Figure 2:
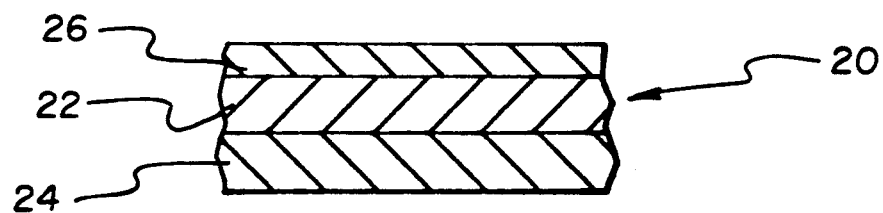
FIG. 2 is a schematic side cross sectional view of film having a magnetic recording layer with which the present invention is adapted to be used.

In FIG. 1, there is shown a camera 10 conventionally comprised of a body 11, viewfinder 12, shutter release button 13 and rear film access door 14. Camera 10 preferably is adapted to receive and utilize photographic film of the type schematically illustrated in FIG. 2 where there is shown a cross section of film 20 having a base layer 22 with a photographic emulsion layer 24 on one side and a layer of magnetic recording material 26 on the other side.

Figure 3:
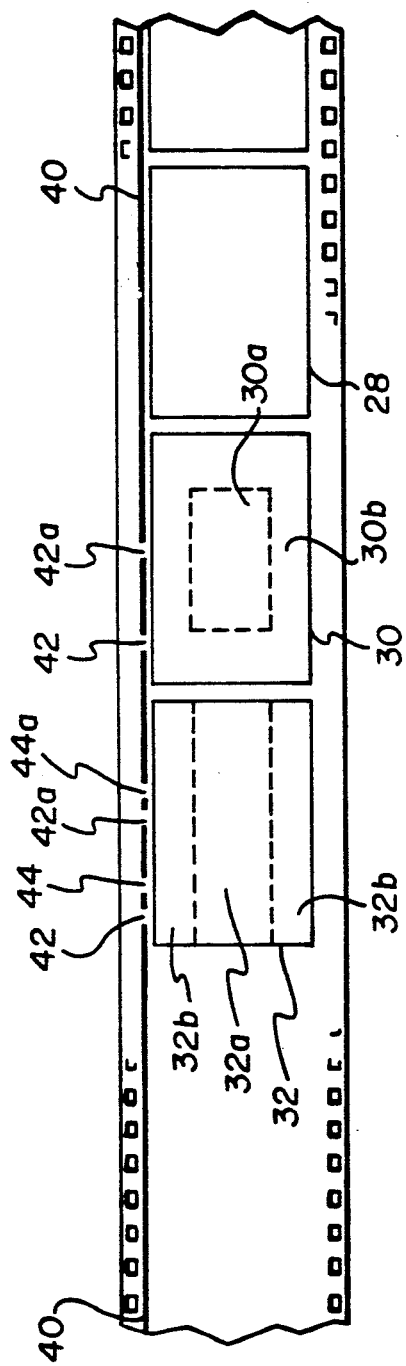
FIG. 3 is a diagrammatic illustration of a film strip illustrating various image frame formats.

Referring to FIG. 3, a plan view of film strip 20 is shown with exposed image frames of normal aspect ratio, e.g. 1:1.5, illustrated in solid lines and with the portions thereof to be used for making pseudo-format prints being shown in dotted outline. Thus, frame 28 represents a normal format image frame that will be reproduced at normal aspect ratio and without image magnification beyond that employed in making a normal print. Image frame 30 shows, in dotted outline, the central portion 30a of the image frame that will be magnified at the printer to create a pseudo-tele print with the same 1:1.5 aspect ratio but with, for example, a 2× normal magnification to give the appearance of a telephoto print. Typically, the surrounding image area 30b is masked off in the printing process. Correspondingly, in image frame 32 the central portion 32a bounded by the dotted outline illustrates a modified aspect ratio of the frame which will be employed at the printer in making a pseudo-pan print by masking the upper and lower portions 30b of the image frame and adjusting the magnification to make the short side of the resulting print substantially the same dimension as the width of the print paper. A data track 40 is recorded in the magnetic layer 26 of the film, preferably pre-recorded there by the film manufacturer to indicate certain film characteristics as previously described.

Referring again to FIG. 1, according to a particular feature of the invention, an image format slide selector button 16 is provided to enable the camera user to establish the existence of a particular format image on the film 20 by a type of magnetic encodement of the magnetic layer 26 on the film. Slide selector button 16 is shown as having three format settings: a central position "N" corresponding to a normal, unmodified image format, a right-hand position "T" corresponding to a pseudo-tele format and left-hand position, "P", corresponding to a pseudo-pan format.

As will be more apparent subsequently, the term "encodement" is used herein in a general sense to encompass both imposition of a unilateral magnetic field on segments of a previously unrecorded magnetic layer as well as the selective erasure of portions of pre-recorded data tracks. This is as distinguished from the more restricted sense of recording discrete, high density data bits along a data track in a specific sequence determined by the information being represented thereby. An important aspect of this distinction is that the high density recording of data requires a relatively costly recording means with associated apparatus to maintain very close head to film interface for reliable recording and subsequent readback. The former, however, enables the use of less costly record apparatus since the employment of a low density form of recording (or erasure) permits the use of looser tolerances in head to film interface. In the embodiments described in detail hereinafter, it is assumed that the apparatus is adapted to operate with film on which there is at least one pre-recorded data track and the encodement occurs in the form of selective erasure of portions of the data track.

Figure 4:
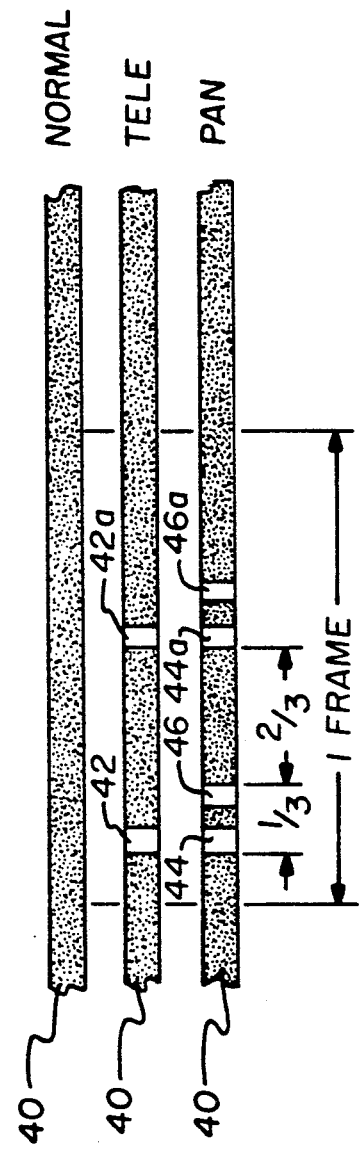
FIG. 4 is a diagrammatic illustration of pre-recorded data tracks showing alternative pseudo-format encodements according to the present invention.

As seen in FIG. 3, and shown more clearly in FIG. 4, selection of pseudo-tele or pseudo-pan format causes a corresponding encodement of the pre-recorded data track 40 in a segment of the track closely associated with, and preferably adjacent, the exposed image frame which is to be reproduced with the selected format. The encodement is in the form of a predetermined pattern of erased portions of the track segments. To enhance the reliability of detection, the pattern may be repeated one or more times for each image frame track segment. Thus, a single erased portion 42 may serve to indicate the existence of a pseudo-tele format for frame 30 and this portion may be repeated, as shown at 42a. Similarly, a pseudo-pan frame may be indicated by dual erased portions 44,46 which are repeated at 44a and 46a. In a presently preferred form of the invention, the erased portions are located in an initial section of the distance between repeated encodement patterns and preferably in the initial one third section to thereby enhance the reliability of detection of the erasure pattern at the photofinishing equipment.

Figure 5:
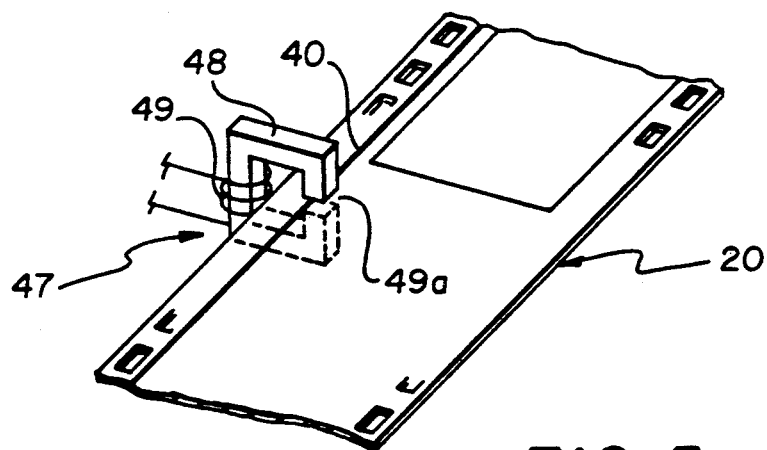
FIG. 5 is a schematic perspective view of a magnetic erasure head and film strip useful in the apparatus of the invention.
Figure 6:
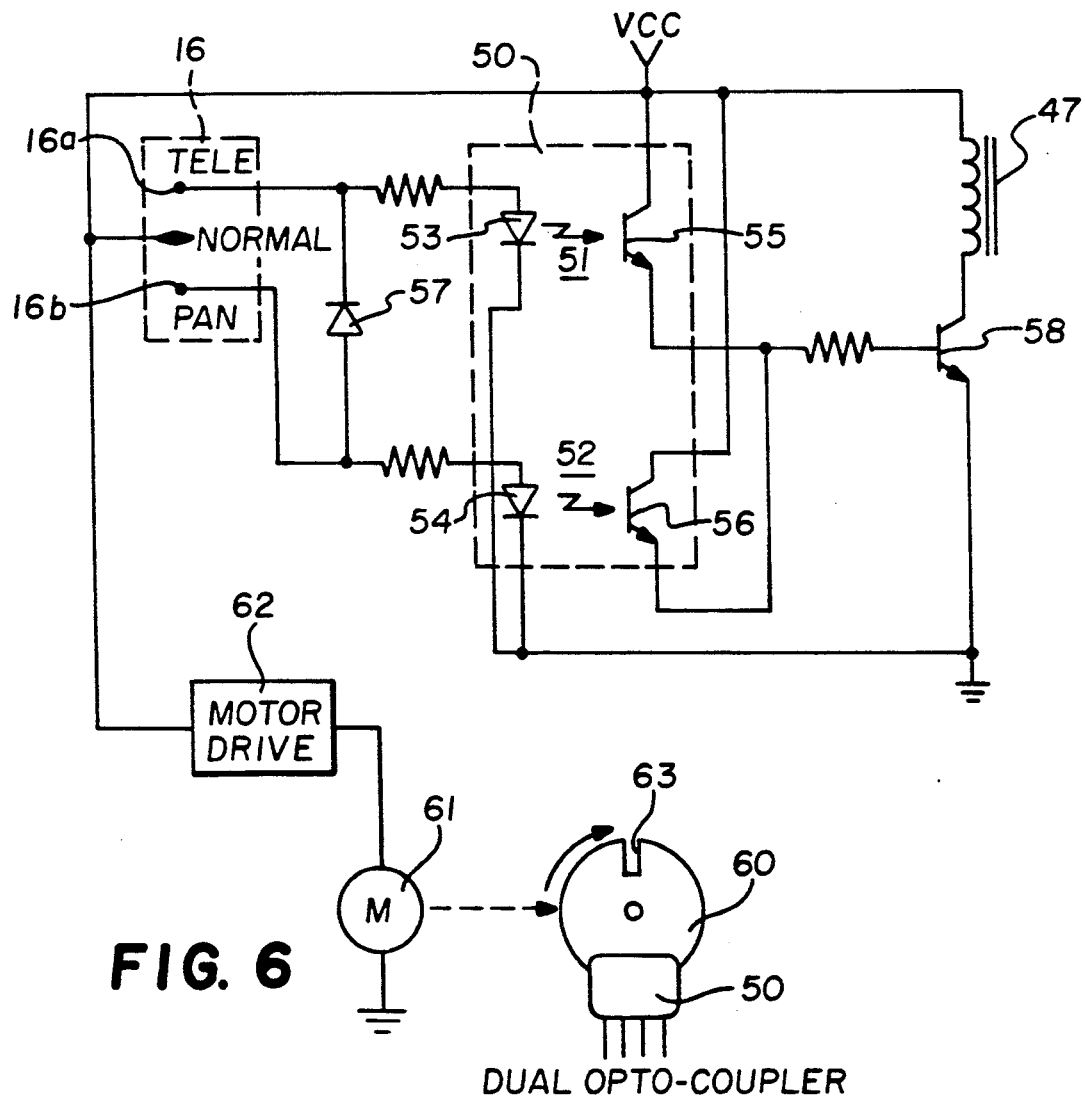
FIG. 6 is a schematic diagram of a control circuit utilizing a dual opto-sensor encodement apparatus illustrative of one embodiment of the invention.

Referring now to FIGS. 5 and 6, camera apparatus for encoding the existence of pseudo-format image frame exposures includes a switch 16 for selecting a predetermined pseudo-format encodement scheme on pre-recorded data track 40. Magnetic erasure means comprised of electromagnetic erase head 47 having a C-shaped armature 48 and a coil 49 is positioned in the camera such that data track 40 passes through the armature air gap 49a as the film is advanced through the camera film gate (not shown). In this way, a magnetic field generated in the air gap in response to a signal applied to coil 49 penetrates unidirectionally through the data track to erase the data in the track as the film is advanced. A C-shaped head is shown by way of example only and it will be appreciated that a conventional inexpensive ring head typically used in audio magnetic recording may be used as an alternative choice. The only difference would be that the unidirectional field, instead of passing vertically through the magnetic layer, would extend horizontally in the layer, as is well known in the magnetic recording art.

Encodement signal generating means for activating erase head 47 to selectively erase portions of the data track includes a dual opto-sensor 50 comprised of two LED/phototransistor pairs 51 and 52. Operating voltage $V_{cc}$ is applied via selector switch output terminal 16a ("tele") to LED 53 and via output terminal 16 to both of LED's 53 and 54. The outputs of phototransistors 55 and 56 are applied to erase head drive transistor 58 to cause erase current to flow through erase head 47 whenever either of the phototransistors is turned on. An encodement shutter disk is interposed in a slot in opto-sensor 50 normally to block the light path between the LED's and phototransistors. Disk 60 is provided with an encodement slot 63. When film is advanced in the camera, shutter disk 60 is driven by film advance motor 61 operating from motor drive 62 to periodically rotate slot 63 through the light paths between the LED's and phototransistors. If the camera user has selected the pseudo-tele format, operating voltage $V_{cc}$ is applied only to LED 53. Diode 57 is reverse biased and prevents operating voltage from being applied from switch terminal 16a to LED 54. Thus, only phototransistor 55 is turned on as slot 63 rotates through opto-sensor 50 and a single erase pulse is applied to transistor 58 to cause erase head 47 to produce a single erased portion 42 on data track 40. If the camera user selects the pseudo-pan format, operating voltage $V_{cc}$ is applied to LED 54 and also to LED 53 through diode 57. As a consequence, when slot 63 rotates opto-sensor 50, both phototransistors are turned on momentarily, in sequence, and a pair of erase pulses are applied to transistor 58 to produced erased portions 44,46 on data track 40.

As is well known in cameras employing roll film, the film is initially advanced in the camera moving the film from a supply cartridge to a take-up reel. Most typically, image frames are exposed as the film is advanced frame-by-frame in the forward direction and when all frames are exposed, the film is rewound into the cartridge. In some cameras, the film is initially pre-wound onto the take-up reel and the frames are exposed as the film is rewound, frame-by-frame, into the supply cartridge. In accordance with a feature of the invention, provision is made to inhibit encodement of the film during rewind (in the first type of camera) or during prewind (in the second type of camera) to ensure that the format encodement is properly associated with its corresponding image and to avoid insertion of the erasure encodements on the data track when no encodement is intended.

Figure 7:
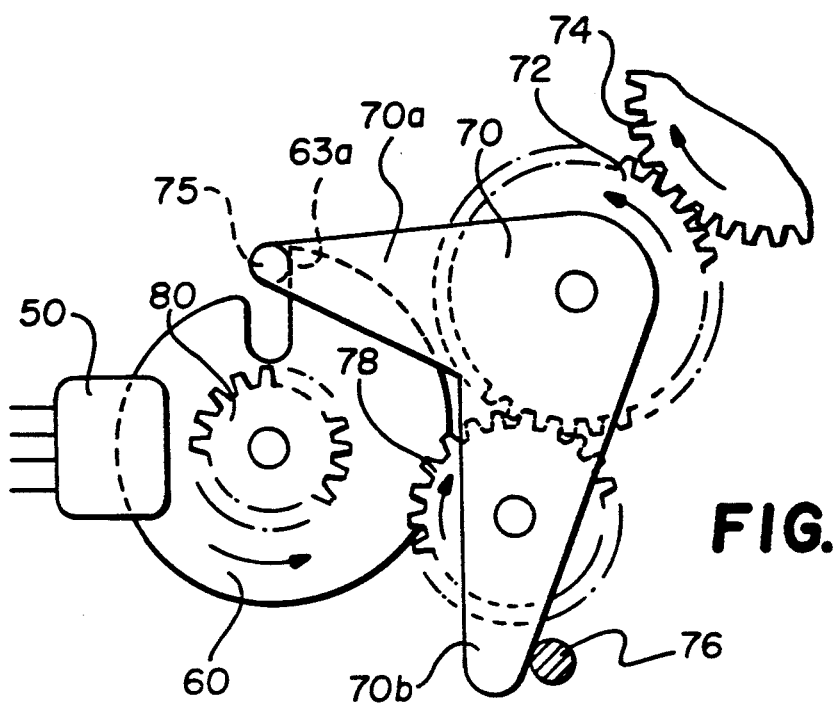
FIGS. 7 and 8 are diagrammatic illustrations of the film advance direction sensing feature of the invention useful with the control circuit of FIG. 6.
Figure 8:
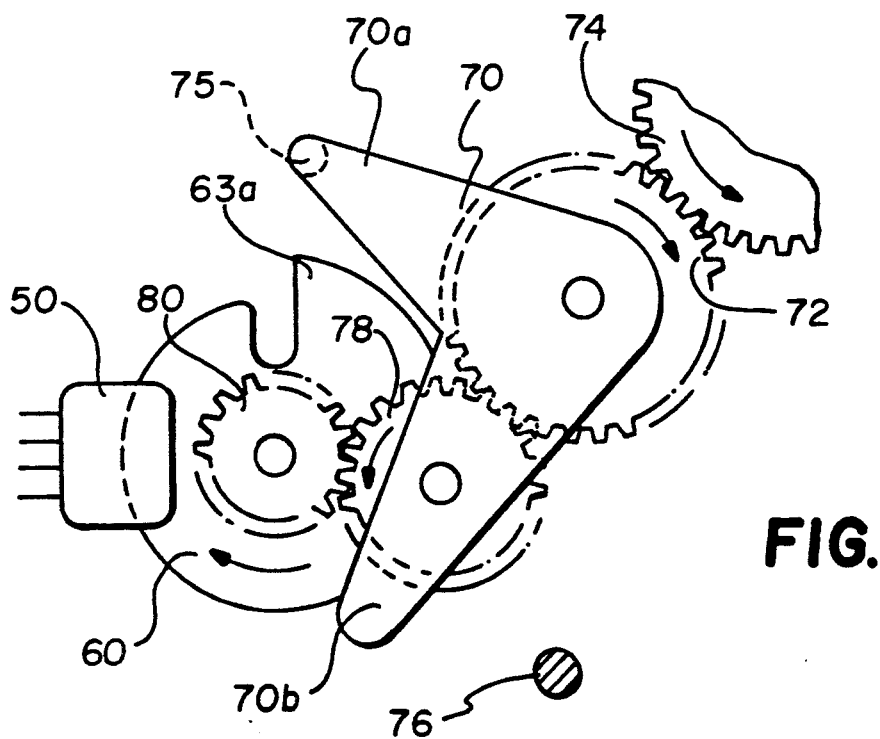

Referring to FIGS. 7 and 8, means for sensing film travel direction and for preventing activation of erase head 47 during either forward or reverse film travel, depending on the camera type, comprises a pivotable lever 70 frictionally attached to gear 72 by means of a slip clutch (not shown). Gear 72 is meshed with gear 74 driven by the camera's film advance motor (not shown). The encodement shutter disk 60 is provided with a radial extension 63a arranged to engage a pivotable stop pin 75 mounted on the end of lever arm 70a when lever is rotated counter-clockwise to a stopped position with lever arm 70b engaging a fixed stop pin 76 attached to the camera body. Thus in the position shown in FIG. 7, with the film advance motor operating in the rewind or prewind direction, shutter disk 60 is restricted from rotating through opto-sensor 50 with the shutter disk blocking both LED/phototransistor light paths in the opto-sensor. In FIG. 8, with the film advance motor operating to advance the film in the picture-taking direction, lever 50 is pivoted clockwise. An intermediate gear 78 is rotatably mounted on lever arm 70b and is in constant engagement with gear 72. As lever 70 is rotated clockwise, gear 78 meshes with drive gear 80 attached to shutter disk 60 to initiate rotation of the disk through the opto-sensor 60. By the time gear 78 engages gear 80, stop pin 75 has pivoted free of the disk radial extension 63a thus allowing disk 63 to rotate freely. It will be appreciated that if switch 16 is set to the normal position, no operating voltage would be applied to the opto-sensor LED's and thus no erasure encodement would occur during prewind or rewind operation. However, with the encodement inhibiting apparatus just described, a fail-safe feature is provided that prevents unintended encodement should the camera user inadvertently leave the selector switch in one of the pseudo-format settings.

Figure 9:
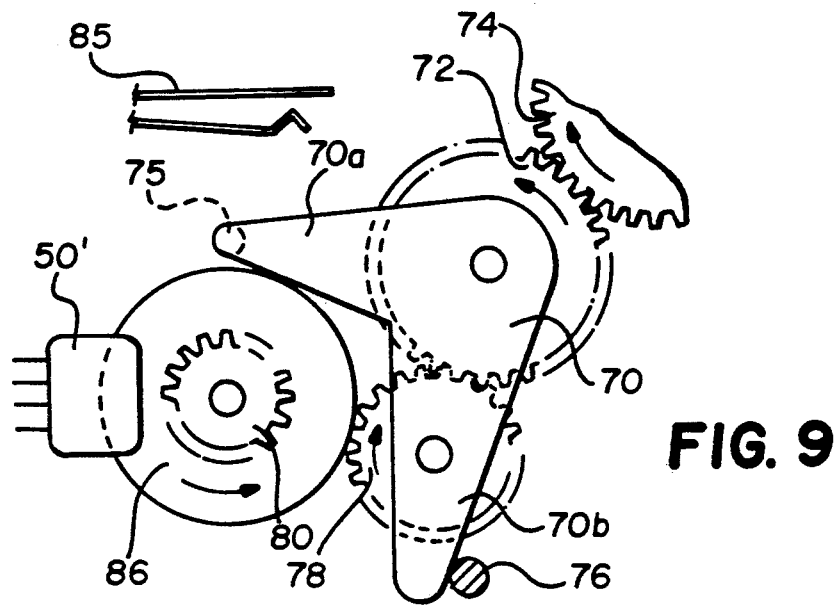
FIGS. 9–10 are diagrammatic illustrations of an alternative embodiment of the film advance direction sensing feature of the invention.
Figure 10:
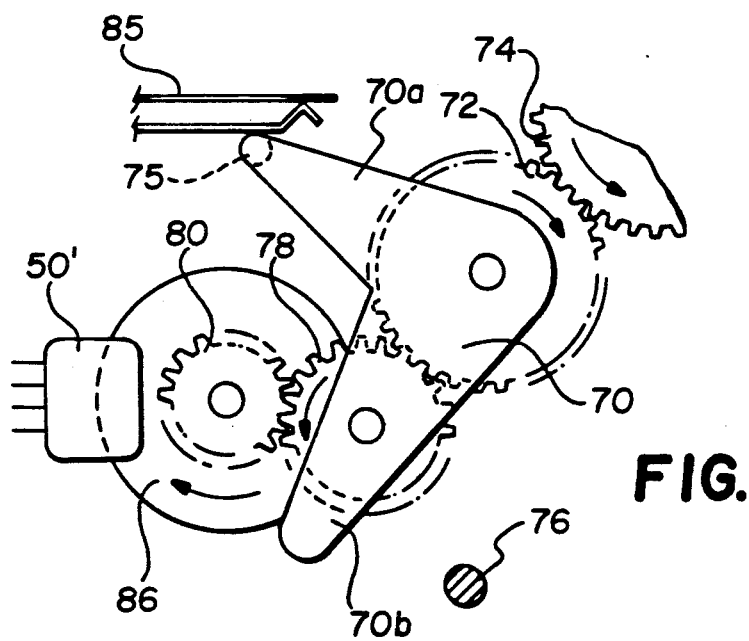
Figure 11:
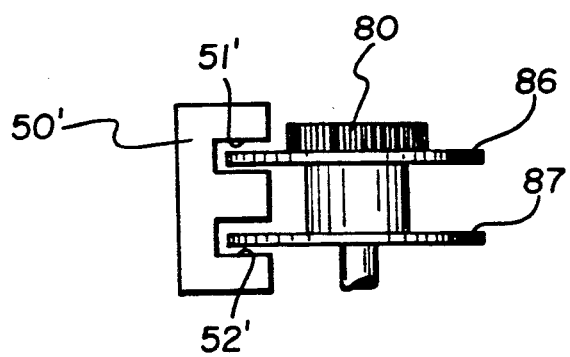
FIG. 11 is a modified opto-sensor encodement apparatus useful with the embodiment of FIGS. 9–10.
Figure 12:
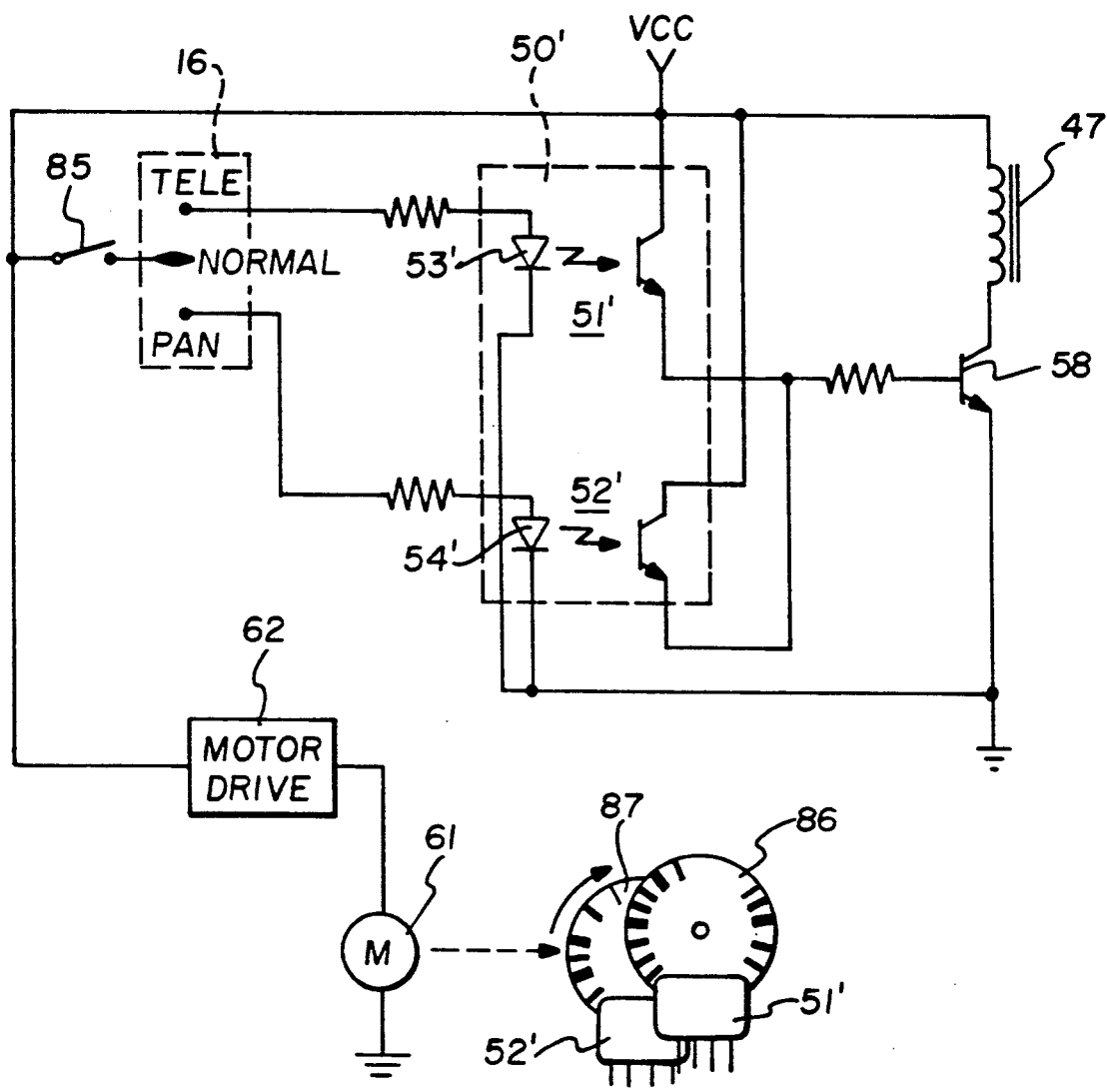
FIG. 12 is a schematic diagram of a control circuit useful with the invention embodiment of FIGS. 9–10.

Referring now to FIGS. 9-11, an alternative embodiment of the camera apparatus of the invention is shown in which like components bear the same reference numeral and similar components bear the same numeral primed. Thus, as with the previous embodiment, the film advance direction (continuous prewind/rewind versus frame-by-frame) is indicated by the direction of pivoting rotation of lever 70. In the prewind/rewind direction, the lever 70 is rotated counter-clockwise to engagement with fixed stop pin 76 and film direction microswitch 85 is open. During frame-by-frame film advance, lever 70 is pivoted clockwise to close microswitch 85 and to mesh intermediate gear 78 with shutter disk gear 80 thereby driving shutter disks 86 and 87. As seen in FIGS. 11 and 12, the means for generating format encodement signals is comprised the pair of encodement shutter disks 86 and 87 which arranged to rotate through stacked opto-sensors 51' and 52'.

The encodement generating circuit of FIG. 12 is similar to the circuit of FIG. 6 except that, during pseudo-format encodement and when direction sensing switch 85 is closed, operating voltage $V_{cc}$ is uniquely applied to either LED 53' or 54' depending on the setting of format selection switch 16. Since each opto-sensor is operated independently, unique encodement schemes for each pseudo-format selection can be provided on each encodement shutter disk. These schemes can be represented by indicia on each disk such as imprinted radial stripes of varying width or spacing as illustrated in FIG. 12 which can be read by a reflective type of opto-sensor or they can take the form of radial slits which can be read by a transmissive type of opto-sensor used in the embodiment of FIGS. 6-8.

While the foregoing embodiments use selective erasure of portions of a pre-recorded data track as the encodement technique, as previously mentioned, the invention envisions that the pseudo-format encodement may take the form of recording of portions of previously unrecorded segments of the magnetic layer associated with and preferably adjacent the corresponding image frames. In such a case, a preferred arrangement would be to utilize a ring-type audio recording head and the encodement pattern would preferably include start and stop sentinels bracketing the actual pseudo-format encodement so that the recording could be properly recognized and detected by magnetic read apparatus at the photofinishing equipment. The start and stop sentinels would desirably be differentiated from the pseudo-format recorded portions by being of different width.

The invention has been described in detail with particular reference to a presently preferred embodiment, but it will be understood that variations and modifications can be effected within the spirit and scope of the invention.

What is claimed is:

1. Photographic camera apparatus for encoding the existence of pseudo-format image frame exposures on film of the type having a layer of magnetic recording material thereon, the apparatus comprising;
    switch means for selecting a predetermined pseudo-format encodement scheme to be encoded on the magnetic layer;
    magnetic recording head means positioned in the camera over the magnetic recording layer for generating a magnetic recording field extending into the magnetic layer;
    and encodement signal generating means comprised of rotating disk means bearing encodement indicia thereon and opto-sensor means responsive to said indicia to activate said recording head to record said selected pseudo-format encodement scheme on said magnetic layer in a path segment associated with said pseudo-format image frame.

2. Photographic camera apparatus for encoding the existence of pseudo-format image frame exposures on film of the type having a layer of magnetic recording material thereon in which prerecorded data exists in a data track extending lengthwise along the film, the apparatus comprising:
    switch means for selecting a predetermined pseudo-format encodement scheme to be encoded on the pre-recorded data track;
    magnetic erasure means positioned in the path of the data track for generating a magnetic erasure field extending into the data track;
    and encodement signal generating means coupled to said magnetic erasure means and responsive to the switch means for activating said erasure means to selectively erase portions of a segment of said data track associated with said pseudo-format frame exposure in accordance with said selected encodement scheme.

3. Apparatus according to claim 2 wherein said encodement signal generating means is comprised of rotating disk means bearing encodement indicia thereon and opto-sensor means responsive to said indicia for generating encodement signals corresponding to one of a plurality of image frame pseudo-formats.

4. Apparatus according to claim 2 further comprising means responsive to direction of film advance for enabling activation of said erasure means when said film is advanced in a frame-by-frame direction and for inhibiting said activation when said film is advanced in a direction opposite thereto.

5. Photographic camera apparatus for encoding the existence of pseudo-format image frame exposures on film of the type having a layer of magnetic recording material thereon in which prerecorded data exists in a data track extending lengthwise along the film, the apparatus comprising:
    means for sensing the direction of movement of the film in the camera;
    encodement disk means having encoding indicia thereon representative of pseudo format encodement schemes to be encoded on the film;
    means for sensing said encoding indicia and for providing an encoding output signal therefrom;
    magnetic erasure head means positioned in the path of the data track for generating a magnetic erasure field extending into the data track;
    encodement selector means for selecting a predetermined pseudo-format encodement scheme to be encoded on the film in association with a corresponding pseudo-format image frame exposure;
    and control circuit means responsive to said selector means, direction sensing means and encoding indicia sensing means for activating said magnetic erasure head means in only one of said film movement directions to selectively erase portions of a segment of said data track associated with said pseudo-format frame exposure in accordance with a corresponding encodement scheme from said encodement disk means.

* * * * *